Oct. 27, 1953          G. H. RENDEL          2,657,177

PLATING THICKNESS REGULATOR

Filed July 10, 1950          2 Sheets-Sheet 1

INVENTOR
GEORGE H. RENDEL,
BY Donald G. Dalton
ATTORNEY

Oct. 27, 1953 G. H. RENDEL 2,657,177
PLATING THICKNESS REGULATOR
Filed July 10, 1950 2 Sheets-Sheet 2

INVENTOR
GEORGE H. RENDEL,
BY Donald G. Dalton
ATTORNEY

Patented Oct. 27, 1953

2,657,177

UNITED STATES PATENT OFFICE 2,657,177

PLATING THICKNESS REGULATOR

George H. Rendel, Mount Lebanon, Pa., assignor to United States Steel Corporation, a corporation of New Jersey Application July 10, 1950, Serial No. 172,855

3 Claims. (Cl. 204—211)

This invention relates to a plating thickness regulator and is a continuation-in-part of my copending application, Serial No. 31,772, filed June 8, 1948, now Patent No. 2,603,595. The regulator is particularly designed to maintain specified electrolytically deposited tin coating on a moving strip by regulating the plating current applied to the strip. While such regulators are in common use, they are not particularly designed to operate in conjunction with a plating thickness meter. Thus it is necessary to provide additional equipment if it is desired to continuously indicate the thickness of the tin.

It is therefore an object of my invention to provide a plating thickness regulator which may be used in conjunction with the plating thickness meter.

Figure 1:
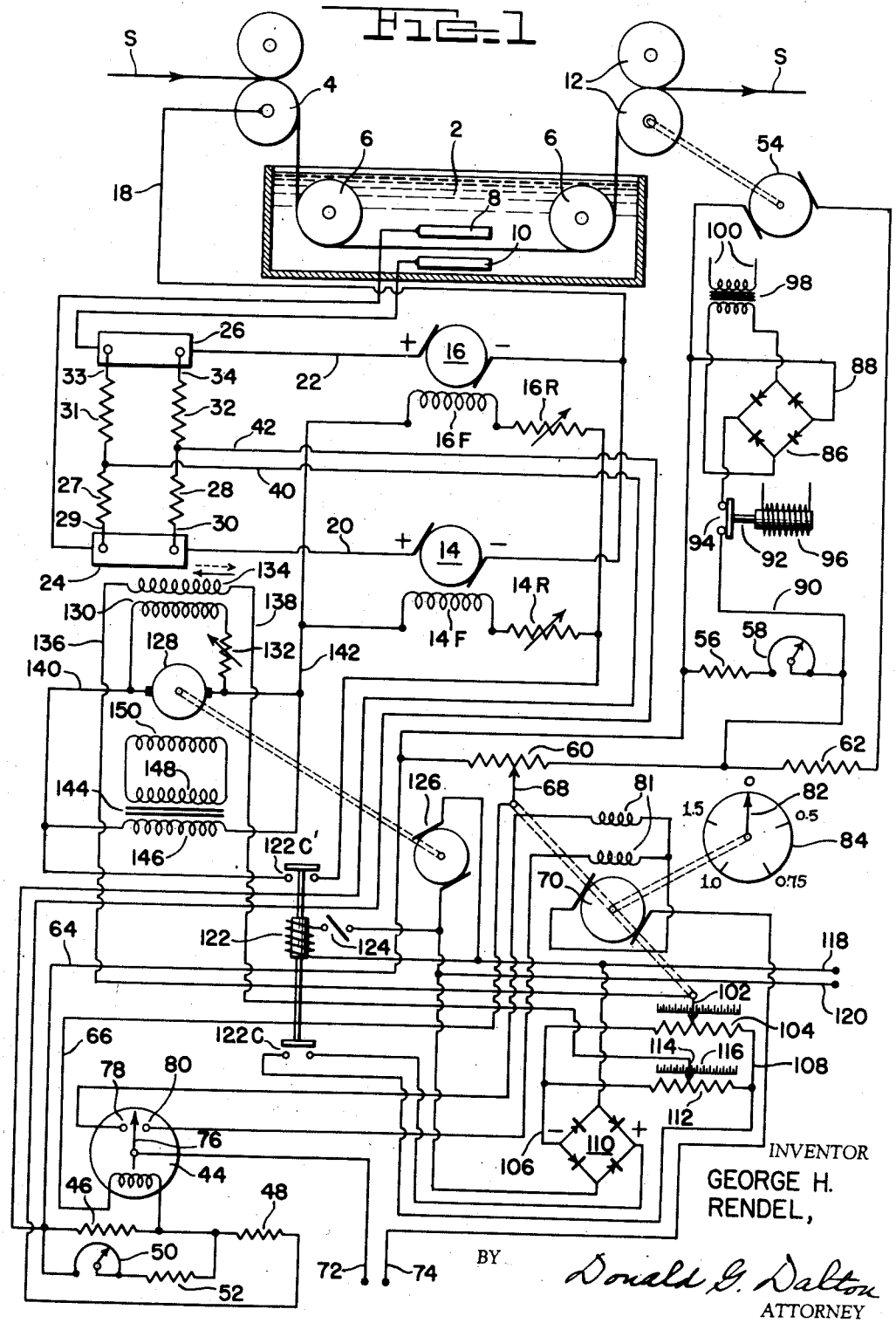
Figure 2:
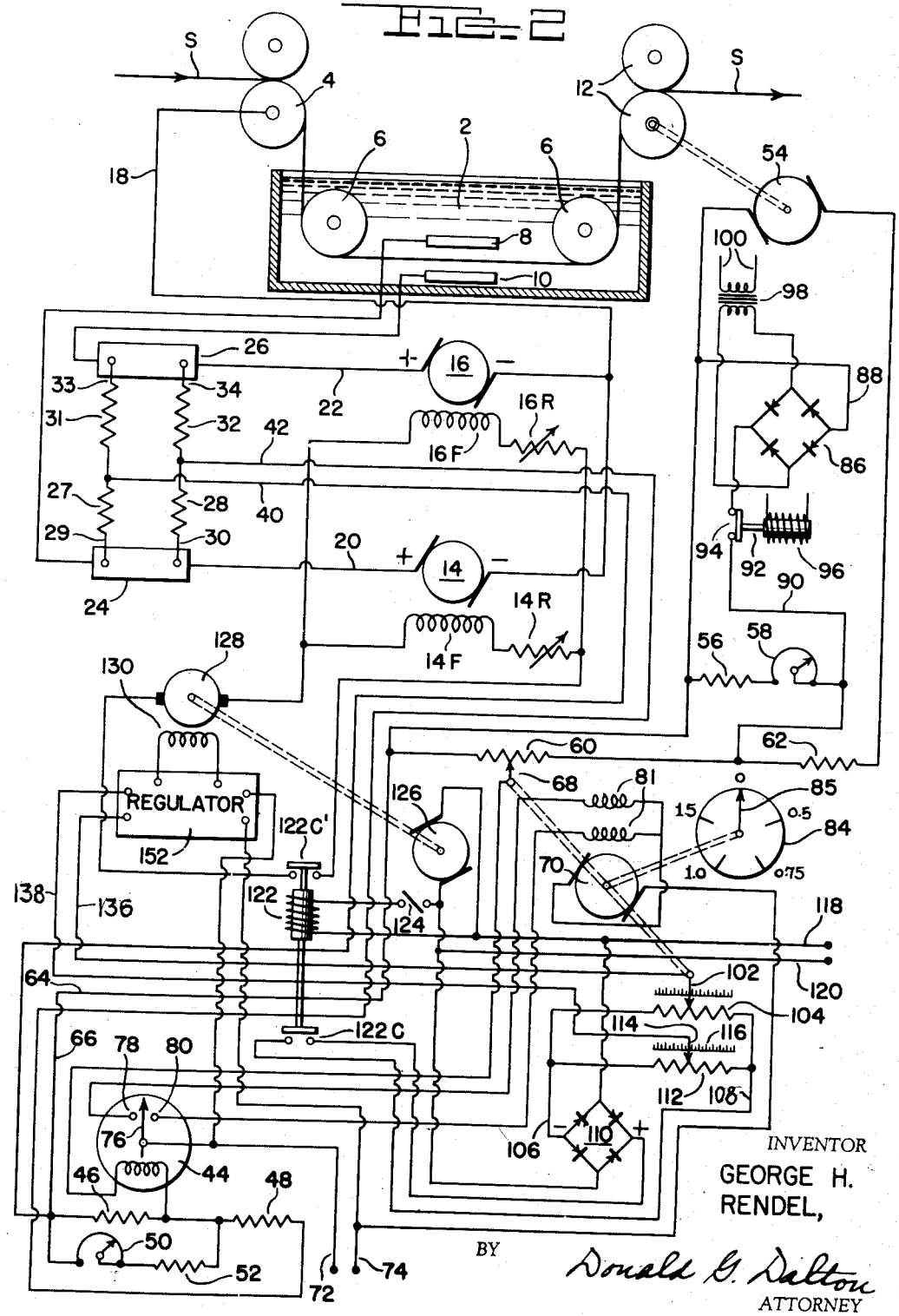

This and other objects will be more apparent after referring to the following specification and attached drawings, in which:

Figure 1 is a schematic wiring diagram showing one specific embodiment of my invention; and Figure 2 is a schematic wiring diagram showing a second embodiment of my invention.

Referring more particularly to the drawings the reference numeral 2 indicates a plating tank containing an electrolyte. The strip S to be coated passes over a conductor roll 4 into the tank 2 and is directed by means of deflector rolls 6 between anodes 8 and 10. The strip passes out of the tank between rolls 12. Plating current is provided to the anode 8 by means of a generator 14 and to anode 10 by means of an identical generator 16. The negative terminals of generators 14 and 16 are connected to the conductor roll 4 through their common lead 18 so that the strip S is maintained at cathode potential. The positive terminal of generator 14 is connected to the anode 8 through a lead 20 and the positive terminal of generator 16 is connected to the anode 10 through a lead 22. A shunt 24 in the line 20 and a shunt 26 in the line 22 measure the plating current for anodes 8 and 10, respectively. The voltage drop across shunt 24 is proportional in amplitude to the current passing through line 20 and the voltage drop across shunt 26 is proportional in amplitude to the current passing through line 22.

In my above identified copending application I use a totalizing shunt to measure the total plating current from generators 14 and 16. While this same arrangement might be used in the present application, I prefer to use the arrangement shown in Figure 1. In this arrangement resistances 27 and 28 are connected to the terminals of shunt 24 by means of lead wires 29 and 30 and resistances 31 and 32 are connected to the terminals of shunt 26 by means of lead wires 33 and 34. The resistances 27 and 31 are connected to a lead wire 40 and resistances 28 and 32 are connected to a lead wire 42. The resistances 27, 28, 31 and 32 are preferably of the same ohmic value. The potential drop across lead wires 40 and 42 is used as the plating current reference in the same manner as the totalizing shunt is used in my copending application. The resistor network operates as follows:

Assuming a current flow from generator 16 that causes a potential drop of 0.050 volt across the terminals of shunt 26 and zero current from generator 14 that results in zero potential drop across the terminals of shunt 24, the potential drop between wires 33 and 34 will be 0.050 volt and there will be zero voltage drop between wires 29 and 30. The 0.050 volt drop between wires 33 and 34 will flow through resistors 27, 28, 31 and 32 thus causing a potential drop of 0.0125 across each of the four resistors with a resultant potential of 0.025 volt appearing across wires 40 and 42.

If the current flow on generator 14 is increased until a potential drop of 0.050 volt appears across the terminals of shunt 24 while the current load through generator 16 remains unchanged, the potential drop between wires 33 and 34 and also between wires 29 and 30 is 0.050 volt. As indicated in Figure 1, wires 29 and 33 are of like polarity and wires 30 and 34 are also of like polarity. Since the potential drops across shunts 24 and 26 are equal in amplitude and their interconnecting wires are connected to like polarity, there will be zero current flow through resistors 27, 28, 31 and 32. Therefore, there is zero voltage drop across each of the resistors and the potential at wires 40 and 42 is 0.050 volt. In a similar manner a resistor network may be employed in combination with any number of current shunts to provide an accurate measurement of the sum of the currents flowing through all of the shunts.

The leads 40 and 42 are connected to a contact making galvanometer 44 through resistances 46 and 48. Connected in shunt across the terminals of resistance 46 is an adjustable potentiometer 50 and resistance 52.

A tachometer generator 54 is mechanically connected to the roll 12. Since the tachometer generator is driven at strip speed, it provides a source of potential having an amplitude directly proportional to the speed of the strip through the plating tank. Tachometer generator 54 is connected to a voltage dividing network comprised of resistor 56, variable potentiometer 58, variable potentiometer 60 and resistor 62. The resistor 56 and potentiometer 58 are connected across the terminals of potentiometer 60 and are used as a shunting means to provide adjustment to compensate for changes in strip width. The potential drop across potentiometer 60 is impressed on the galvanometer 44 through lines 64 and 66. The adjustable arm 68 of potentiometer 60 is mechanically connected to a split field reversible motor 70 which is provided with power through the lines 72 and 74. Line 72 is connected to the movable element 76 of the galvanometer 44. Two stationary contacts 78 and 80 are provided in the galvanometer and a circuit is completed to one of the fields of motor 70 depending upon which of the stationary contacts is contacted by the element 76. The direction of rotation of the motor 70 depends upon which of its fields 81 is energized. The motor 70 is also mechanically connected to the arm 82 of a dial 84 which is calibrated to read from 0 to 1.5 in pounds of tin per base box. The movement of the arm 82 corresponds to the movement of the arm 68.

When the tinning line is not operating, the voltage output from tachometer generator 54 and across lines 40 and 42 are zero so that no energy is impressed on the winding of galvanometer 44. Therefore, the contacts of galvanometer 44 will remain open and the arms 68 and 82 will remain in their attained position instead of indicating zero. Thus, it cannot be determined by looking at the dial 84 that the line is not in operation. If a continuous record is being kept, it will indicate that the line is operating at all times. In order to remedy this I provide a rectifier 86 having its rectified output applied across the resistor 69 through the lines 88 and 90. Located in the line 90 is a relay 92 having normally closed contacts 94 and a coil 96 which is energized when the line is operating. Alternating current is applied to rectifier 86 from the secondary winding of a transformer 98. The primary winding of the transformer 98 is energized from alternating current supply lines 100.

When the line is operating the coil 96 is energized, thus opening the contacts 94 so that no current is supplied through the lines 88 and 90 to potentiometer 60. When the line is at rest, the coil 96 is deenergized closing contacts 94 so that a direct current potential is applied across the potentiometer 60. This voltage energizes the winding of galvanometer 44, thus moving its pointer 76 in a direction to complete the circuit to the reverse winding of motor 70, which in turn, moves the contact arms 68 and 82 to the zero position. These arms are maintained in this position until the tinning line is started, when the normally closed contacts 94 are opened and the meter is restored to normal operation.

The plating thickness regulator including potentiometers 104 and 112 and exciter 128 is actuated from the plating thickness meter by mechanically connecting the motor 70 to the contact arm 102 of a potentiometer 104. The potentiometer 104 is connected by means of wires 106 and 108 to a rectifier 110 which provides a substantially constant D. C. potential on wires 106 and 108. A second potentiometer 112 is connected to the rectifier 110 in parallel with potentiometer 104. Potentiometer 112 is provided with an operating arm 114 and a scale 116 calibrated to show coating thickness. The rectifier 110 is connected to an A. C. power source by means of wires 118 and 120. Also connected to the wires 118 and 120 is a relay coil 122 which is provided with normally open contacts 122C and 122C'. Energization of coil 122 is controlled by means of a start-stop switch 124. The normally open contact 122C is provided in the line 108 to control the flow of current to potentiometers 104 and 112. Also connected to wires 118 and 120 is the motor 126 of a regulating exciter 128. The regulating exciter 128 has a self-excited field winding 130 which may be adjusted by means of a variable resistor 132 to provide sufficient magnetization to maintain the electrical output of exciter 128 at its obtained value. The exciter 128 also has a control field winding 134 which is connected to the contact arms 102 and 114 by means of wires 136 and 138, respectively. The output of exciter 128 is connected to the fields 14F and 16F of generators 14 and 16 through wires 140 and 142. The normally open contacts 122C' are located in the wire 140. To insure stability of the regulating system an anti-hunting transformer 144 is employed in the conventional manner. The primary winding 146 of the transformer is connected across the wires 140 and 142 and the secondary winding 148 is connected to stabilizing field 150 of the exciter 128. Adjustable resistors 14R and 16R may be connected in series with the field windings 14F and 16F, respectively, to provide individual adjustment of plating generators 14 and 16.

The operation of the device is as follows:

Assuming that the rheostats 50 and 58 are adjusted for plating current efficiency and strip width and assuming that it is desired to deposit 0.75 pound coating on the strip S, contact arm 114 is adjusted to the point where the calibrated dial 116 indicates 0.75 which would result for example in contact arm 114 being positioned exactly midway on potentiometer 112. The start-stop switch 124 is then closed, thus energizing relay coil 122 to close contacts 122C and 122C'. This completes the circuit from the rectifier 110 to potentiometers 104 and 112. Assuming that rectifier 110 impresses 100 volts on wires 106 and 108 the voltage drop across potentiometers 104 and 112 would be 100 volts when the tinning line is in operation. Therefore, the potential of contact arm 114 will be 50 volts positive when referred to wire 106. Assuming that the tinning line is in the process of being started from rest, the indicating pointer 82 on dial 84 will indicate zero and the contact arm 102 will be positioned at the extreme end nearest wire 106. Therefore, a potential difference of 50 volts will exist between contact arms 102 and 114 which will cause current to flow through field winding 134 in the direction indicated by the solid line arrow to increase the voltage output of regulating exciter 128. As the potential of exciter 128 is raised, the voltage of plating generators 14 and 16 increases, thus causing an increase in current flow through the electrolytic bath. This causes motor 70 to rotate in a direction to move contact arm 102 away from wire 106. The current in field winding 134 will continue to flow in the same direction but at a diminishing rate as contact arm 102 approaches the midpoint of potentiometer 104. When contact arm 102 reaches the midpoint of potentiometer 104, which corresponds to 0.75 pound per base box coating thickness, there will be a zero potential difference between contact arms 102 and 114. Therefore, the current will stop flowing through field winding 134 and the voltage output from regulating exciter 128 is maintained at its attained value by the magnetizing current supplied by its self-excited field winding 130. If motor 70 moves contact 102 past the midpoint on potentiometer 104, the potential from contact 102 to wire 106 will be at a higher positive potential than the potential between contact arm 114 and wire 106. Therefore, current will flow through field winding 134 in the opposite direction as shown by the broken arrow. This reduces the magnetizing forces in exciter 128 and lowers its potential output, thus reducing the excitation on generator fields 14F and 16F to lower the current passing through the electrolytic bath. This in turn causes motor 70 to rotate in a direction to reduce the potential difference between contact arms 102 and 114.

Figure 2 shows a second embodiment of my invention in which an electronic voltage regulator 152 is employed to control the magnetizing current in field winding 130 of the exciter 128. The electrical output of the electronic regulator 152 is controlled by the difference in polarity of the potential between contact arms 102 and 114. For example, when contact arm 114 is positive when referred to contact arm 102 the electrical output from regulator 152 is at its maximum and when contact 114 is negative when referred to contact arm 102 the electrical output from regulator 152 is at its minimum. Thus electronic regulator 152 recognizes polarity and voltage unbalance between wires 136 and 138 and responds to this voltage difference to control the field winding 130 of exciter generator 128 to effect the plating current which will reposition contact arm 102 on potentiometer 104 to retain a balance of potential between wires 136 and 138. Otherwise, the construction and operation of this embodiment is the same as that of Figure 1.

While two embodiments of my invention have been shown and described it will be apparent that other adaptations and modifications may be made without departing from the scope of the following claims.

I claim:

1. Apparatus for controlling the amount of metal electrolytically deposited on an elongated longitudinally moving object comprising a generator for supplying current to said object, a field winding for said generator, means for obtaining a potential proportional to the speed of the object, means for obtaining a potential proportional to the output of said generator, means for comparing the said potentials, an electrical connection between each of the first two means and the comparing means, a potentiometer in one of said electric connections, a first contact arm for said potentiometer, means operable by said comparing means for restoring balance between the said potentials, said last named means including a reversible motor, electric means connecting said motor to said comparing means for operation of said motor in opposite directions in accordance with the direction of unbalance of the said potentials, a second potentiometer, power leads for connecting said second potentiometer to a source of D. C. power, a third potentiometer connected in parallel with the second potentiometer, a contact arm for each of said second and third potentiometers, means for connecting said motor to one of said second and third contact arms to move the same proportional to movement of said motor, an exciter for said field winding, electrical means connecting said second and third contact arms to said exciter, and means connecting said motor to said first contact arm to move the same proportional to the movement of said motor.

2. Apparatus for controlling the amount of metal electrolytically deposited on an elongated longitudinally moving object comprising a generator for supplying current to said object, a field winding for said generator, means for obtaining a potential proportional to the speed of the object, means for obtaining a potential proportional to the output of said generator, means for comparing the said potentials, an electrical connection between each of the first two means and the comparing means, a potentiometer in one of the said electric connections, a first contact arm for said potentiometer, means operable by said comparing means for restoring balance between the said potentials, said last named means including a reversible motor, electric means connecting said motor to said comparing means for operation of said motor in opposite directions in accordance with the direction of unbalance of the said potentials, a second potentiometer, power leads for connecting said second potentiometer to a source of D. C. power, a third potentiometer connected in parallel with the second potentiometer, a contact arm for each of said second and third potentiometers, means for connecting said motor to one of said second and third contact arms to move the same proportional to movement of said motor, an exciter for said field winding, electrical means connecting said second and third contact arms to said exciter, means connecting said motor to the first said contact arm to move the same proportional to the movement of said motor, a scale for indicating thickness of the coating on said object, an indicating arm coacting with said scale, and means for connecting said indicating arm to said motor.

3. Apparatus for controlling the amount of metal electrolytically deposited on an elongated longitudinally moving object comprising a generator for supplying current to said object, a field winding for said generator, means for obtaining a potential proportional to the speed of the object, means for obtaining a potential proportional to the output of said generator, means for comparing the said potentials, an electrical connection between each of the first two means and the comparing means, a potentiometer in one of the said electric connections, a first contact arm for said potentiometer, means operable by said comparing means for restoring balance between the said potentials, said last named means including a reversible motor, electric means connecting said motor to said comparing means for operation of said motor in opposite directions in accordance with the direction of unbalance of the said potentials, a rectifier, a second potentiometer electrically connected to said rectifier, a third potentiometer connected in parallel with the second potentiometer, means in the connection from said rectifier to said second and third potentiometers for interrupting the flow of current to said potentiometers, a contact arm for each of said second and third potentiometers, means for connecting said motor to one of said second and third contact arms to move the same proportional to movement of said motor, an exciter for said field winding, electrical means connecting said second and third contact arms to said exciter, means connecting said motor to the first said contact arm to move the same proportional to the movement of said motor, a scale for indicating thickness of the coating on said object, an indicating arm coacting with said scale, and means for connecting said indicating arm to said motor.

GEORGE H. RENDEL.

References Cited in the file of this patent

UNITED STATES PATENTS

| Number | Name | Date |
| --- | --- | --- |
| 2,325,401 | Hurlston | July 27, 1943 |
| 2,427,661 | Cook | Sept. 23, 1947 |